United States Patent
Shearer et al.

(10) Patent No.: US 12,171,163 B2
(45) Date of Patent: Dec. 24, 2024

(54) AUTONOMOUS CONTROL OF A CROP HARVESTING HEADER FOR DETECTING REEL WRAPPING

(71) Applicant: MacDon Industries Ltd., Winnipeg (CA)

(72) Inventors: Bruce Robert Shearer, Winnipeg (CA); Jeffrey David Leachman, Winnipeg (CA)

(73) Assignee: MacDon Industries LTD., Winnipeg (CA)

(*) Notice: Subject to any disclaimer, the term of this patent is extended or adjusted under 35 U.S.C. 154(b) by 1065 days.

(21) Appl. No.: 16/769,090

(22) PCT Filed: Jan. 14, 2019

(86) PCT No.: PCT/CA2019/050047
§ 371 (c)(1),
(2) Date: Jun. 2, 2020

(87) PCT Pub. No.: WO2019/140512
PCT Pub. Date: Jul. 25, 2019

(65) Prior Publication Data
US 2021/0137006 A1    May 13, 2021

Related U.S. Application Data

(60) Provisional application No. 62/617,815, filed on Jan. 16, 2018, provisional application No. 62/691,652, filed on Jun. 29, 2018.

(51) Int. Cl.
*A01D 41/14* (2006.01)
*A01D 41/127* (2006.01)
(Continued)

(52) U.S. Cl.
CPC ....... *A01D 41/141* (2013.01); *A01D 41/1271* (2013.01); *A01D 57/04* (2013.01); *A01D 75/182* (2013.01)

(58) Field of Classification Search
CPC .. A01D 57/04; A01D 41/141; A01D 41/1271; A01D 75/182; A01D 75/187
See application file for complete search history.

(56) References Cited

U.S. PATENT DOCUMENTS

| 4,199,927 A | 4/1980 | Craig et al. |
| 5,794,421 A | 8/1998 | Maichle |

(Continued)

FOREIGN PATENT DOCUMENTS

| EP | 1356729 A1 | 10/2003 | |
| EP | 2143316 A1 * | 1/2010 | ........... A01D 41/127 |

(Continued)

OTHER PUBLICATIONS

EP_2143316_A1 _-_ English_translation, Jan. 13, 2010.*

*Primary Examiner* — Thomas B Will
*Assistant Examiner* — Julia C Tran
(74) *Attorney, Agent, or Firm* — Miller Canfield

(57) ABSTRACT

A harvesting vehicle includes a header having a cutter bar, a crop transport draper and a reel mounted above the cutter bar to sweep the crop to the draper. The operation of the header is autonomously monitored and controlled to reduce operator loads or to run autonomously by detecting: reel wrapping; differential rates of flow of crop on the header at different locations; where the crop to be cut is at least partly lodged so that stems of the crop are not vertical; the presence of a crop streak of uncut or poorly cut crop behind the cutter bar and/or a band of disturbed soil behind the cutter bar. The detector is arranged to control ground speed, header height, reel height and operation.

8 Claims, 4 Drawing Sheets

(51) Int. Cl.
*A01D 57/04* (2006.01)
*A01D 75/18* (2006.01)

(56) References Cited

U.S. PATENT DOCUMENTS

| | | | |
|---|---|---|---|
| 6,185,990 B1 | 2/2001 | Missotten et al. | |
| 6,381,932 B1 * | 5/2002 | Clauss | A01F 29/10 56/10.2 J |
| 6,843,044 B2 | 1/2005 | Clauss | |
| 8,291,684 B2 | 10/2012 | Remillard et al. | |
| 8,527,157 B2 | 9/2013 | Imhof et al. | |
| 8,635,840 B2 * | 1/2014 | Behnke | A01D 41/1277 460/4 |
| 8,843,283 B2 | 9/2014 | Strelioff et al. | |
| 9,629,308 B2 * | 4/2017 | Schøler | A01D 41/1277 |
| 9,696,162 B2 | 7/2017 | Anderson | |
| 9,807,933 B2 | 11/2017 | Boyd et al. | |
| 2003/0061794 A1 | 4/2003 | Remillard et al. | |
| 2011/0270494 A1 | 11/2011 | Imhof et al. | |
| 2013/0116883 A1 | 5/2013 | Kormann | |
| 2015/0027199 A1 | 1/2015 | Sarma | |
| 2015/0216123 A1 | 8/2015 | Digman | |
| 2015/0319911 A1 * | 11/2015 | Wilson | G06T 7/20 701/41 |
| 2016/0262301 A1 | 9/2016 | Van Vooren et al. | |
| 2017/0091954 A1 * | 3/2017 | Roth | A01D 41/1271 |
| 2018/0084719 A1 * | 3/2018 | Neitemeier | G01F 1/06 |
| 2019/0021226 A1 * | 1/2019 | Dima | A01D 34/008 |

FOREIGN PATENT DOCUMENTS

| | | |
|---|---|---|
| EP | 2628378 A2 | 8/2013 |
| EP | 2713702 A1 | 4/2014 |
| EP | 3011824 A1 | 4/2016 |
| EP | 3095314 A1 | 11/2016 |
| EP | 3403485 A1 | 11/2018 |
| EP | 3420798 A1 | 1/2019 |
| EP | 3574741 A1 | 12/2019 |
| RU | 2402896 C1 | 11/2010 |
| RU | 2631685 C2 | 9/2017 |
| WO | WO2014093814 A1 | 6/2014 |

* cited by examiner

AUTONOMOUS CONTROL OF A CROP HARVESTING HEADER FOR DETECTING REEL WRAPPING

This invention relates to a header for a combine harvester or swather where the header includes components for detecting one or more operating conditions of the header for providing at least partial autonomy of control of the operation of the header or assistance to an operator of the header to reduce the level of operator participation.

BACKGROUND OF THE INVENTION

Operator control of a harvesting machine is in many conditions a difficult task with many functions to be monitored to keep the harvesting machine cutting efficiently and effectively by avoiding poor cutting parameters or even coming to a halt due to a blockage. It is of course a general objective to make such machines more autonomous to reduce operator contribution. The level of autonomy can be high to allow such machines to operate wholly autonomously or can be lower so that one operator can control one or more similar machines in an array or simply to reduce the level of skill or attention of a single operator.

Many areas of the harvesting machine are complex and require very close attention to the operating conditions. Much attention has been given to monitoring the operation of the threshing system of a combine harvester so as to autonomously control that system. Also attention has been given to calculating the crop throughput by monitoring the height and density of the crop in advance of the harvester and the crop in process in the harvester particularly within the feeder house so as to optimize the efficiency of the threshing system

SUMMARY OF THE INVENTION

The arrangements herein provide monitoring of many different conditions of the harvesting operation and these can be used independently or in combination to assist in potentially autonomous control of the harvesting operation.

In one arrangement for use particularly in monitoring reel wrapping, there is provided a crop harvesting apparatus comprising:

a harvesting vehicle mounted on ground wheels for movement across ground carrying a standing crop for harvesting;

a header having a cutter bar for cutting standing crop and a crop transport device for transporting the standing crop inwardly from ends of the header to a collection location of the harvesting vehicle and a reel mounted above the cutter bar for rotation about an axis parallel to the cutter bar to sweep the crop over the cutter bar to the transport device;

a mounting assembly for carrying the header on the harvesting vehicle;

a detector for detecting reel wrapping where crop material extends at least partly around the reel and remains in place for more than one rotation of the reel and for generating a signal in response thereto;

and a control system arranged to generate an output signal responsive thereto and providing in response to the signal a control output to the machine.

In one arrangement for use particularly in monitoring the operation of the feeding system to the feeder house, the system monitors differential velocity changes and there is provided a crop harvesting machine comprising:

a harvesting vehicle mounted on ground wheels for movement across ground carrying a standing crop for harvesting;

a header having a cutter bar for cutting standing crop and a crop transport device for transporting the standing crop inwardly from ends of the header to a collection location of the harvesting vehicle and a reel mounted above the cutter bar for rotation about an axis parallel to the cutter bar to sweep the crop over the cutter bar to the transport device;

a mounting assembly for carrying the header on the harvesting vehicle;

a detector for detecting differential rates of flow of crop on the header at different locations so that a detection is made when the rate changes at one location differently from at another location;

and a control system arranged to generate an output signal responsive thereto and providing in response to the signal a control output to the machine.

In one arrangement for use particularly in monitoring lodged crop, there is provided a crop harvesting machine comprising:

a harvesting vehicle mounted on ground wheels for movement across ground carrying a standing crop for harvesting;

a header having a cutter bar for cutting standing crop and a crop transport device for transporting the standing crop inwardly from ends of the header to a collection location of the harvesting vehicle and a reel mounted above the cutter bar for rotation about an axis parallel to the cutter bar to sweep the crop over the cutter bar to the transport device;

a mounting assembly for carrying the header on the harvesting vehicle;

a detector for detecting where the crop to be cut is at least partly lodged so that stems of the crop are not vertical;

and a control system arranged to generate an output signal responsive thereto and providing in response to the signal a control output to the machine.

In one arrangement for use particularly in monitoring the operation of the cutting system, there is provided a crop harvesting machine comprising:

a harvesting vehicle mounted on ground wheels for movement across ground carrying a standing crop for harvesting;

a header having a cutter bar for cutting standing crop and a crop transport device for transporting the standing crop inwardly from ends of the header to a collection location of the harvesting vehicle and a reel mounted above the cutter bar for rotation about an axis parallel to the cutter bar to sweep the crop over the cutter bar to the transport device;

a mounting assembly for carrying the header on the harvesting vehicle;

a detector for detecting the presence of a crop streak of uncut or poorly cut crop behind the cutter bar and/or a band of disturbed soil behind the cutter bar.

and a control system arranged to generate an output signal responsive thereto and providing in response to the signal a control output to the machine.

In one arrangement for use particularly in monitoring the operation of the feeding system to the feeder house, the system monitors the transition zone of a draper feeding system and there is provided a crop harvesting machine comprising:

a harvesting vehicle mounted on ground wheels for movement across ground carrying a standing crop for harvesting;

a header having a cutter bar for cutting standing crop;

a crop transport draper system for transporting the standing crop inwardly from ends of the header to a collection location of the harvesting vehicle including two side drapers and center feed draper moving rearwardly;

and a reel mounted above the cutter bar for rotation about an axis parallel to the cutter bar to sweep the crop over the cutter bar to the transport device;

a mounting assembly for carrying the header on the harvesting vehicle;

a detector for detecting changes in movement of the crop on the drapers;

and a control system arranged to generate an output signal responsive thereto and providing in response to the signal a control output to the machine.

In one arrangement for use particularly in controlling crop flow, there is provided a harvesting machine or method of harvesting which particularly uses a reel construction comprising:

a harvesting vehicle mounted on ground wheels for movement across ground carrying a standing crop for harvesting;

a header having a cutter bar for cutting standing crop and a crop transport device for transporting the standing crop inwardly from ends of the header to a collection location of the harvesting vehicle;

and a reel for rotation about an axis parallel to the cutter bar above the cutter bar to sweep the crop over the cutter bar to the transport device;

the reel comprising a plurality of transversely separated reel sections mounted on a plurality of transversely spaced reel support arms;

a mounting assembly for carrying the header on the harvesting vehicle;

a detector for detecting a condition of the crop in advance of the cutter bar and providing in response to the signal a control output to the machine;

wherein the control output to the machine causes adjustment of the reel support arms independently to raise and lower independently one of the sections relative to at least one other section to accommodate down sections of crop differentially across a wide header.

In another arrangement of the present invention there is provided a crop harvesting machine comprising:

a harvesting vehicle mounted on ground wheels for movement across ground carrying a standing crop for harvesting;

a header having a cutter bar for cutting standing crop;

a crop transport draper system for transporting the standing crop inwardly from ends of the header to a collection location of the harvesting vehicle including two side drapers and center feed draper moving rearwardly;

and a reel mounted above the cutter bar for rotation about an axis parallel to the cutter bar to sweep the crop over the cutter bar to the transport device;

a mounting assembly for carrying the header on the harvesting vehicle;

a detecting system for detecting or predicting occurrence of a blockage in movement of crop into the harvesting machine and providing an output signal indicative thereof;

and a control system arranged to slow or halt operation of the two side drapers in response to the output signal.

Any of the above defined features can be used in combination with any other one or more of the above defined features either independently or in combination.

In any one of the above arrangements there is provided an improvement wherein the detector monitors movement of the crop on the feed draper.

In any one of the above arrangements there is provided an improvement wherein the detector monitors movement of the crop at the rear end of the feed draper.

In any one of the above arrangements there is provided an improvement wherein there is provided a feed roller above the rear end of the feed draper and wherein the detector monitors the movement of the crop just in front of the feed roller for changes in velocity at the transition location before entry into the feeder house.

In any one of the above arrangements there is provided an improvement wherein the vehicle comprises a swather tractor.

In any one of the above arrangements there is provided an improvement wherein the condition autonomously detected is any disruption in the crop flow of the header behind the cutter bar.

In any one of the above arrangements there is provided an improvement wherein the condition autonomously detected is a height of crop in advance of the cutter bar.

In any one of the above arrangements there is provided an improvement wherein the condition autonomously detected is a height of the crop which is detected by ultrasonic height sensor.

In any one of the above arrangements there is provided an improvement wherein the detection is carried out by analysis of a series of sequential images to determine changes therein wherein the images are obtained by a Camera, radar or lidar.

In any one of the above arrangements there is provided an improvement wherein the detection includes a lookup table of conditions.

In any one of the above arrangements there is provided an improvement wherein the control output to the machine causes movement of the reel forwardly or rearwardly.

In any one of the above arrangements there is provided an improvement wherein the control output to the machine causes changes in the reel finger angle.

In any one of the above arrangements there is provided an improvement wherein the control output comprises a display to the operator warning of the detected condition.

In any one of the above arrangements there is provided an improvement wherein the control output provides an operation to halt forward movement of the machine.

In any one of the above arrangements there is provided an improvement wherein the lodgment of the crop is at least partly detected by an analysis of the difference of the stem angles from vertical.

In any one of the above arrangements there is provided an improvement wherein the lodgment of the crop is at least partly detected by an analysis of the difference of the stem angles from vertical obtained by image analysis.

In any one of the above arrangements there is provided an improvement wherein the lodgment of the crop is detected by a combination of an analysis of the difference of the stem angles from vertical and a detection of a top of the crop in advance of the cutter bar.

In any one of the above arrangements there is provided an improvement wherein the output signal is dependent on categorizing the degree of lodgment.

In any one of the above arrangements there is provided an improvement wherein there is provided a method of distinguishing between short crop and crop having a low height by lodgment.

In any one of the above arrangements there is provided an improvement wherein the condition autonomously detected is the presence of a crop streak of uncut or poorly cut crop behind the cutter bar which is detected by monitoring crop height.

In any one of the above arrangements there is provided an improvement wherein the condition autonomously monitored is a band of disturbed soil behind the cutter bar.

In any one of the above arrangements there is provided an improvement wherein soil behind the cutter bar is detected by difference in color between the band and the ground.

In any one of the above arrangements there is provided an improvement wherein the control output to the machine causes a halt in ground speed and raising of the cutter bar to clear a cutter bar blockage of soil and/or crop material.

In one option, the control output can simply comprise a display to the operator warning of the detected condition. However in a more autonomous system, preferably the control output provides an operation to one or more controlled components of the header as discussed in more detail hereinafter.

In some embodiments, the vehicle comprises a combine harvester where the center support comprises the feeder house. However many of the features herein can also be applied to a header on a swather tractor. The header can include sickle cutting system but also the invention can in many cases be applied to a rotary header.

The system herein can be used to monitor at least one operating condition of the header as discussed hereinafter and typically most or all of the conditions described can be monitored to maximize the autonomous operation of the system. The selection of conditions to be monitored depends on whether the system is intended for complete autonomous monitoring of the header operation or merely as an aid for an onboard worker who retains primary responsibility. It will be appreciated that a higher level of monitoring can allow the worker to be located at another location such as in another similar vehicle operating in tandem with the monitored vehicle or even in a central remote location controlling an array of the vehicles.

In one embodiment, the condition detected is reel wrapping where crop material extends at least partly around the reel and remains in place for more than one rotation of the reel. In this case it is typically necessary if the wrapping becomes too severe to halt operation of the header and remove the wrapping manually. The detection system can use many different systems including camera monitoring of the reel along its length. However a laser beam along the header at one angular location can detect wrapping at any longitudinal position provided the wrapping is sufficient to reach that angular position and sufficient to occlude the laser beam.

In another optional feature, the condition autonomously detected is the rate of flow of crop on the header at one or more locations.

In another optional feature, the condition autonomously detected is differential rates of flow of crop on the header at different locations so that a detection is made when the rate changes at one location differently from at another location. This can be indicative of a failure in the system rather than merely a change in the volume of an incoming crop.

In another optional feature, the condition autonomously detected is any disruption in the crop flow on the header behind the cutter bar. This can be used to monitor the operation of the cutter system, typically a sickle bar where individual blades can be damaged or plugged. That is the flow of material over the cutter bar and onto the table or draper of the header to be carried away by the transport system can be monitored to ensure that the flow is smooth and consistent. If any inconsistencies are located, this will be indicative of a failure in the cutting system either by a blockage or by a breakage. The monitoring of a long cutter bar can be carried out in zones allowing a comparison between zones to detect inconsistencies.

In addition to or as an alternate to the monitoring behind the cutter bar, the condition detected can be the rate of crop flow on the conveyor. The conveyor can be an auger system but more effective the monitoring can be done on a draper where the rate of flow can be detected as a speed or as a weight of volume.

One important area where monitoring can detect problems is the rate of crop flow at the intake to the harvesting machine. In a draper header this is the feed draper which carries the crop material into the feeder house. In the event that material at this location slows, this is indicative of bunching caused by overfeeding the feeder house and can lead to inconsistent feeding into the combine harvester or as a blockage shutting down the operation until cleared.

Sickle and guard breakage on combine headers is a daily issue. Crop, soil, or crop residue also cause sickles to plug on a regular basis in some conditions. This may be seen as a disruption in the crop flow of the header. Material slows, or builds and releases in lumps from the cutter bar.

Draper or auger issues are presented by the crop mass on one (or both) sides of the header by the hesitation or complete stoppage of the crop mass on top of the conveyor. If the conveyor has an issue it may slow down or stop completely, but it is also possible that the conveyor is working fine mechanically and the crop is simply not conveying as intended.

In the transition area directly in front of the feeder house, it is common for crop to hesitate or stall directly in front of the feeder house because the bulk of the crop is transitioning from lateral movement to the aft direction into the feeder house. The crop also must be highly compressed to fit into the feeder house, and this can present flow issues.

Thus the arrangement herein uses at least one camera to capture video of crop flow through header in the key areas of concern mentioned above. The video feed is sent to a processor which utilizes motion based object/particle tracking to calculate speeds of the crop flow in visible areas. In order to determine if there is an issue with crop flow the software can run different comparisons. It is beneficial (but not required) to break the video into zones and calculate flow speeds in each zone as a speed and direction to represent the zone. It is also beneficial for the analysis to input key operating variable such as ground speed, draper speed, reel speed and crop type so it can refine expected crop speeds in each zone for each condition. With all the above information the software can compare speed and direction of each zone monitored relative to each other. If the speed or direction of one zone is not within the expected range a signal is generated indicating there is a problem and what exactly triggered the problem. The software can also compare output of each zone against lookup tables which are defined by the operating conditions present such as ground speed, reel speed, etc.

Another area which can be monitored or detected is the effectiveness of the cutting system. This is applicable either to a sickle header or to other cutting systems particularly rotary cutters. This ineffective cutting action displays itself in the material left on the field immediately behind the cutter bar as it moves forward.

The ineffective cutting action can be determined in some cases by the presence of a crop streak of uncut or poorly cut crop behind the cutter bar. This is typically a few inches wide due to localized failure for example by a broken cutting blade or by a blockage of crop material or soil on the cutter bar at a localized position. This streak of standing crop can be detected by height sensors such as a ultrasonic sensors or by image analysis. Other methods may also be available.

Where the failure to properly cut causes a pushing effect on the soil, this condition can be detected by locating a band of disturbed soil behind the cutter bar. This preferably is detected by difference in color or color consistency between the band and the adjacent ground. That is the disturbed ground caused by the pushing action of a blockage at the cutter bar has less crop residue and is more consistently the color of the soil and this difference can be readily detected by image analysis.

An uncut strip of crop is left behind the cutter bar as a streak. The streak may be narrow or wide, but is an abrupt change in height of the stubble that indicates something is not working correctly with the cutter bar.

In applications where the header is cutting on the ground the header cutting system may become plugged with soil or crop residue, and begin to push material in front of the cutter bar. The visual indicator for this issue is a strip of soil which has just been exposed. The color or consistency of this newly exposed soil is usually different than the soil around it, making it easy to detect for the operator.

It is desirable therefore to identify any, or all, of the above conditions that indicate a cutting issue automatically with the electronic system. Firstly ultrasonic sensors (one or more) are mounted behind/under the header constantly read stubble height. A controller monitors the data received real time from the sensors, looking for anomalies in height that are substantially indicative of a knife issue causing tall stubble height. If such a condition arises a signal is sent which would indicate there is an issue, and perhaps the location of the issue on the cutter bar. Subsequent use of this signal could be a warning alarm for the operator, or may trigger an automatic response by the machine to attempt to fix the issue autonomously.

Secondly other sensors are used such as radar, lidar, optical, where a cameras (one or more) is mounted behind the cutter bar that monitors the ground for the entire width of the header. A controller analyzes the stream of images and looks for disturbances in the soil which would be consistent with cutter bar exposing soil due to a cutter bar plug. Soil of darker color, or more consistent in color (less crop material on it) are the primary indicators for the analysis. If such a condition is detected the controller alerts the operator, or nitiate a machine function to attempt to clear the plug by raising the header momentarily.

In another embodiment, the condition detected relates to the presence of an area of lodged crop in front of the cutter bar which can be combined with a detection of the height of crop in advance of the cutter bar. In this case the detection can again be carried out by analysis of a series of sequential images to determine changes therein. However ultrasonic height detection can be used or contact sensors which engage the crop heads can be used. The output from these sensors can be used to determine an indication of crop height and to distinguish short crop from downed or lodged crop which must be treated very differently in the operation of the combine harvester.

Thus the lodgment of the crop is at least partly detected by an analysis of the difference of the stem angles from vertical and this difference can be obtained by image analysis looking for the angles of the stems in different images at different angles since the crop may be lying longitudinal of the direction of travel or transverse.

Thus the lodgment of the crop can be detected by a combination of an analysis of the difference of the stem angles from vertical and a detection of a top of the crop in advance of the cutter bar. The output signal obtained from the analysis can also be dependent on categorizing the degree of lodgment so as to provide an output to the harvester to tailor the action to the degree and direction of lodgment.

When cutting crop with a swather or combine it is common to see the crop at different heights throughout different areas the field. It is also common to see specific areas of the field lodge. If crop is lodged it is beneficial to make changes to the header to better recover the crop. These can include lowering the cutter bar if cutting above ground, moving the reel ahead, increasing the reel finger angle to "pick up" the crop better.

The arrangement herein thus uses at least one camera to capture images or video ahead of the header, and analyze them to detect down crop. The primary features of lodged crop is usually reduced height (similar to short crop) but also key that the plant is no longer vertical. The image processing software looks for stems/leaves to determine the angle they are at and compare that to known values of standing or lodged crop of that variety. This is typically not a simple yes/no analysis because crop may only have a slight lean or may be completely horizontal or anywhere in between. It is beneficial to categorize the degree of lodge into severity ranges which each require a different response by the operator or automatic adjusting system. It would also be beneficial to identify the direction of lean, because crop leaning into or away from header would benefit from different header settings.

In another feature to be monitored, there can also be provided a system for detecting reel wrapping where crop material extends at least partly around the reel and remains in place for more than one rotation of the reel. From this detection an output signal causes a control output to the machine which can be an indication to the operator or can autonomously cause a response from the machine typically where the reel is temporarily lifted out of the crop to allow the wrapping to be discarded.

That is the reel of the header is prone to wrapping or more commonly "carry over". Generally if the reel is engaged too low in the crop it is more likely to carry some plant material around. That carry over contributes to seed loss and may start wrapping on the reel which will not clear itself. If the system detects sees excessive carry over or wrapping generally it will lift the reel out of the crop some amount.

In response to many of the above detected the control output to the machine causes a reduction in ground speed. However in some cases the control output to the machine causes a halt in ground speed and raising of the cutter bar to clear a cutter bar blockage of soil and/or crop material. In other cases the control output to the machine causes movement of the reel either downwardly to provide a more aggressive harvesting action or upwardly to release wrapping problems. In yet other arrangements the system tries to set the reel at a most effective operating condition for the crop conditions and ground speed so that the system causes movement of the reel to change reel height. The system can also cause the control output to the machine causes movement of the reel forwardly or rearwardly and to change the angle of the finger pattern around the axis of the reel.

Another possibility where the reel is formed in separate sections carried on separate arms across the header is for the control output to the machine to cause adjustment of the reel support arms independently to accommodate downed sections of crop differentially.

The draper header disclosed herein thus generally consists of a left-hand and a right-hand crop conveying belt, as well as a central feed conveyor which conveys crop into a feed drum, which then feeds cut crop to the inclined conveyor in the feeder house of the combine harvester.

It is common for unevenly distributed crop to form a large ball or wad of crop which is then conveyed to the central feed conveyor or feed drum. This conveyor is typically a roller mounted above the discharge opening into the feeder house which carries auger flight sections to carry the material inwardly of the ends of the header toward the opening. This roller is often slightly longer than the discharge opening but in some cases the roller extends across the full width of the header.

When a large ball or wad of crop material is conveyed into the feed drum it is common that the feed drum will be overloaded and stop turning or stall. This overload is also possible further downstream in the inclined conveyor of the combine harvester, or even later in the crop processor of the combine harvester. In any case, the overload can in some cases be detected by an actual stall or stopping of a feed component such as the feed drum.

In other cases the overload is predicted using the motion detectors described herein so that the existence of the factors which lead to a blockage or stall are predicted in advance before the stall actually occurs.

Typically, when an overload occurs or factors indicating that this is about to occur are detected, it is typical that the header drives continue to operate normally which continues to cut crop, and convey it inward to the central feed conveyor. More cut crop material is then added to the original ball or wad of crop, further aggravating the operation of clearing the plug. This can then lead to the operator of the combine harvester being required to exit the cab of the machine to remove the ball or wad of crop material by hand. All of this reduces the overall productivity of the harvester.

In the present arrangement there is provided a system that stops or slows the right-hand and left-hand conveyors, which stops the inward conveyance of cut crop material to the central feed conveyor upon detection of a stall of the central feed drum or upon detection of factors which indicate or predict that such as stall is about to occur. This can also occur upon detection of a stall of the inclined conveyor of the combine harvester, or the processor of the combine harvester.

That is, as soon as the stall it detected or is predicted, the movement of the side drapers is instantaneously halted so that the feeding of crop toward the center feed draper is halted. It will be appreciated that in today's very wide headers, a considerable volume of crop is sitting on the side drapers and will be fed to the feed draper unless this movement is immediately halted. Thus even if a blockage is detected before it occurs, the blockage may be actually completed by the further movement of the crop on the side drapers unless halted. Also if the blockage is not predicted but instead detected after it occurs by the stalling of a feed member, that blockage is exacerbated by the feeding of additional material into the blockage.

Typically the forward movement of the harvesting machine is controlled under the responsibility of the driver so that the halting of the machine is carried out by the driver as soon as he is informed of the detection of the blockage situation. However controls to the machine may be provided which actually halt the forward movement of the machine on communication of the blockage situation or of the halting of the operation of the side drapers in response to the detection of the blockage situation.

The system is also arranged to provide a delay in restarting the side drapers after the blockage is removed and the operation of the system restarts. That is, upon detection of the restarting of the stalled feed member, the drive to the side drapers is held stationary for a period of time to allow the amount of crop in the feed system to pass into the combine separation before more material is fed from the side drapers. The delay time is calculated from the known normal rate of feed relative to a calculation of the amount of excess material in the system. This amount can pe averaged from previous information or can be detected by measuring various parameters in the blockage itself, for example a height bunched material in the blockage. That is the left-hand and right-hand conveyors do not continue conveying for some amount of time after the original plug is successfully cleared.

In addition, when a blockage is predicted rather than actually detected, the speed of operation of the side drapers and be slowed, optionally with slowing of the forward speed of the machine to give opportunity to the system to clear the potential blockage rather than allow it to occur.

Thus the arrangement defined above can operate to halt the side drapers in the event of detection of or prediction of a blockage at the feed system.

Thus the arrangement defined above can operate to slow the side drapers in the event of prediction of a blockage at the feed system.

Thus the arrangement defined above can operate to halt the forward speed of the machine.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
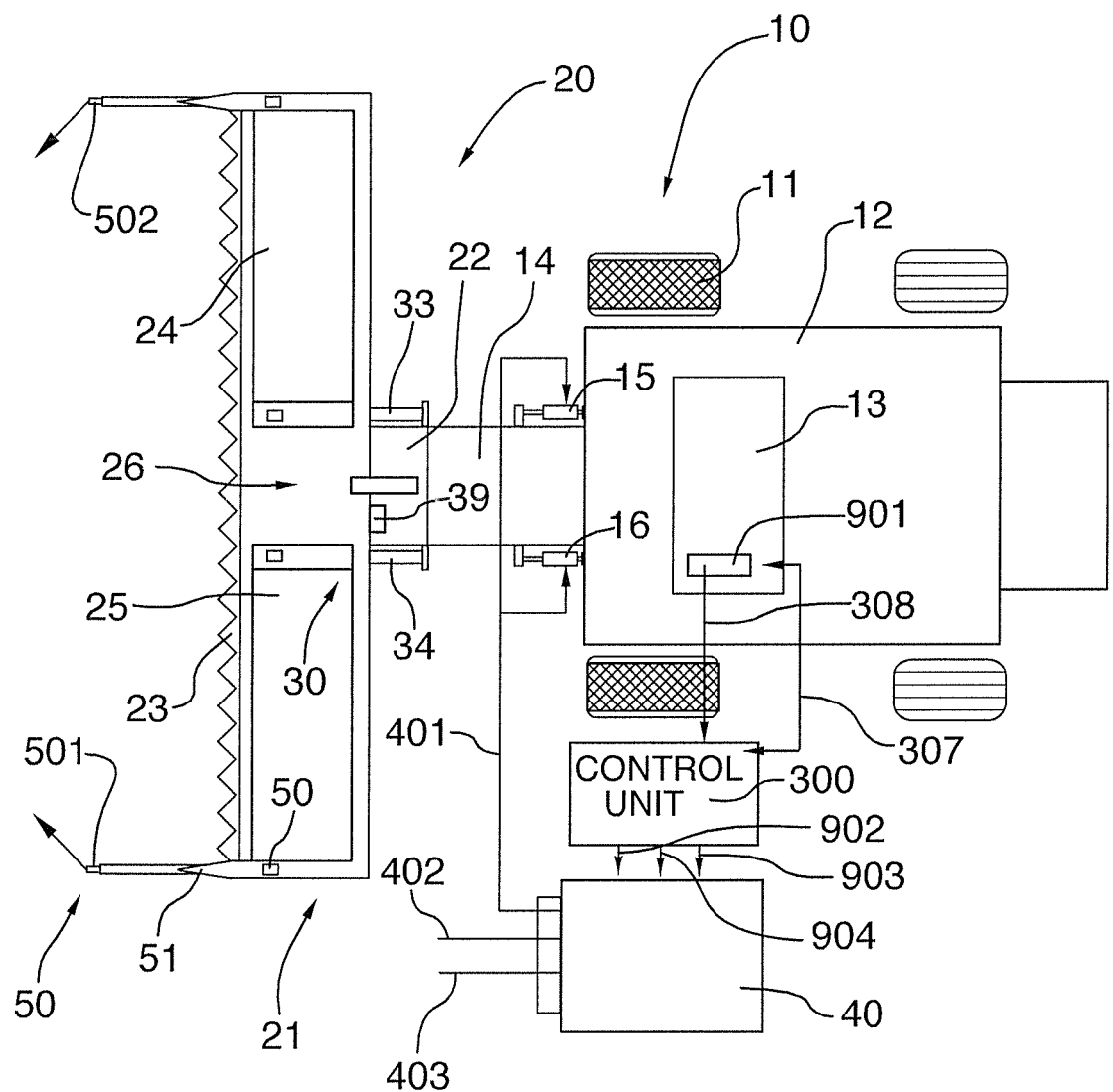
FIG. 1 is a schematic plan view of a combine harvester including a header assembly according to the present invention.
Figure 2:
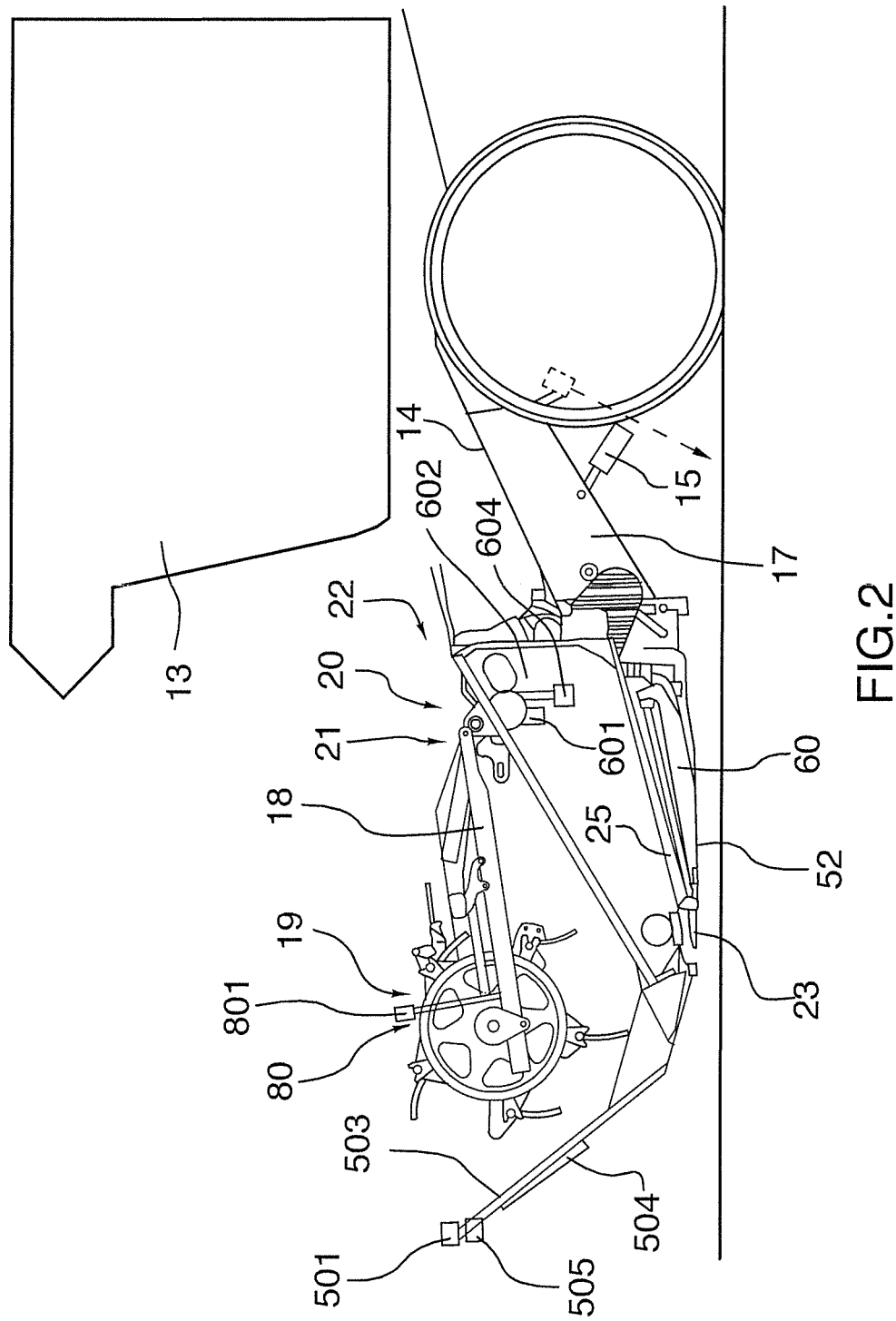
FIG. 2 is a schematic cross sectional view at the feeder house of the combine harvester of FIG. 1.
Figure 3:
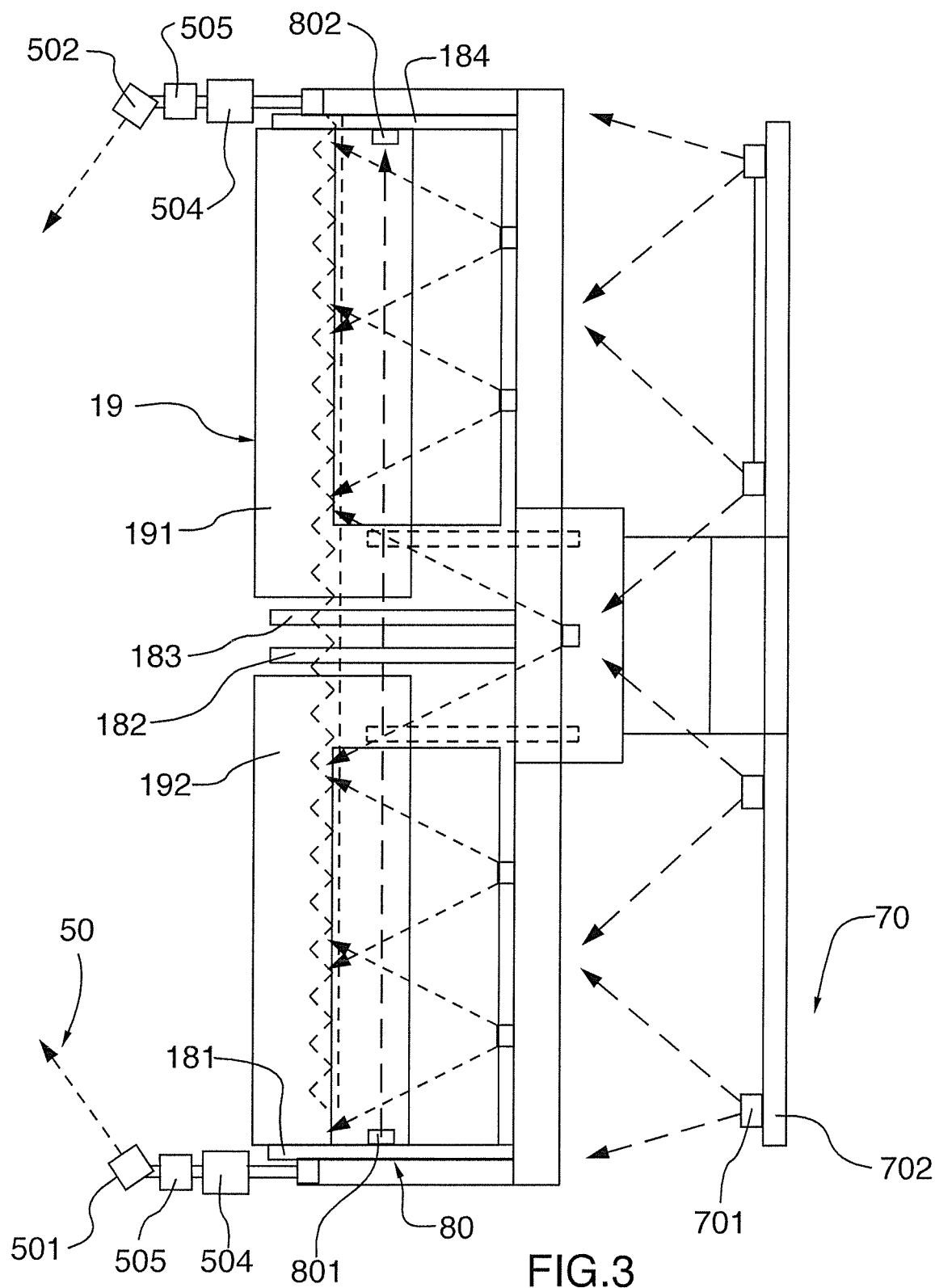
FIG. 3 is a top plan view of the header only of the combine harvester of FIG. 1.
Figure 4:
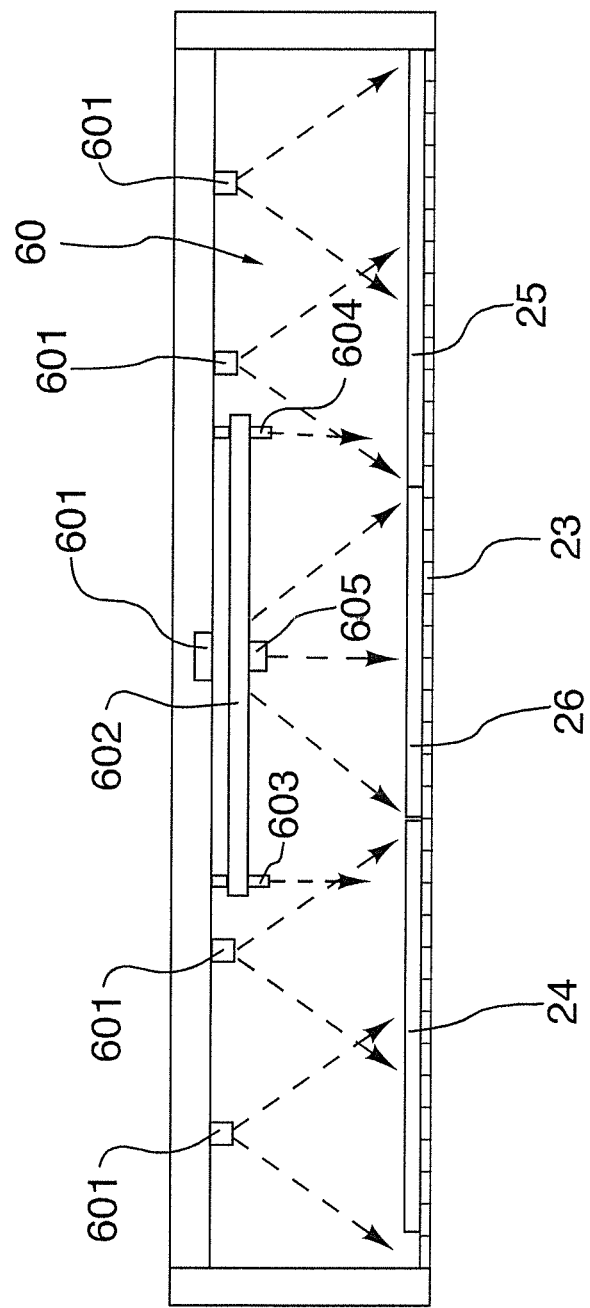
FIG. 4 is a front elevational view of the header only of the combine harvester of FIG. 1.

A vehicle such as a combine harvester is shown schematically at 10 and includes ground wheels 11, a main housing 12 containing the crop processing devices, a cab 13 for the operator and a feeder house 14 for receiving the crop material and feeding it into the housing for processing. The details of combine harvesters are well known to a person skilled in this art so that no detail is necessary for an understanding of this invention.

The feeder house is mounted on the housing in a manner which allows it to be raised and lowered to lift the header carried on the front of the combine. For example the feeder house includes cylinders 15, 16 which raise and lower the front end 17 of the feeder house so as to raise and lower the header as required.

A header assembly 20 includes a header 21 and an adapter 22 which attaches the header to the feeder house 14. The adapter is provided to control the feeding of material into the feeder house and to provide a lifting force to the header 21 to carry it forwardly on the front 17 of the feeder house 14. The adapter includes float suspension using springs or a cylinder system allowing the header to float upwardly and downwardly relative to the feeder house.

The header is generally of a conventional construction well known to a person skilled in this art and the major components include a cutter bar 23 for cutting standing crop and a crop transport device defined by a pair of drapers 24 and 25 for transporting the standing crop inwardly from ends of the header to a collection location 26 for feeding to the combine harvester. A reel 19 is mounted over the cutter bar 23 on arms 18 by which the height of the reel can be changed to change the spacing between reel bats of the reel and the cutter bar 23. The reel can slide forwardly and rearwardly of the arms 18 so as to change the position of the reel relative to the cutter bar. The movement of the fingers of the reel is controlled by a cam system as is well known to provide a selected finger movement pattern as the reel rotates around its axis. The position of the cam can be adjusted angularly around the axis so as to change the angular position at which certain finger angles are adopted. Both of these movements are actuated by control cylinders or by other means which allow them to be adjusted by the control system 301. Also the reel is formed in two sections 191 and 192 arranged side by side and carried on arms 181, 182, 183 and 184 allowing independent adjustment of the two reel sections. The independent adjustment can be in relation one or more of height, forward and aft position and finger angle as required. The independent adjustment can thus be used when the crop is in different conditions of height and/or lodgment across the width of the header. In order to provide such independent control, additional sensors may be provided at the location between the reels to provide an independent assessment of the crop.

The header can run in contact with the ground so that part of the weight is carried on the float system and part applies a ground force. Alternatively the header can include two ground engaging wheels on the header one on each side of the adapter 22. The number of wheels can be increased in some cases so that double wheels are used or wheels on an axle but in generally the wheels act so support the header on each side of the support provided by the adapter 22.

The connection between the adapter and the header may include a suspension system 30 with a center top link 32 and two side suspension arms 33 and 34 for carrying the header on the adapter. As is well known, the suspension arrangement allows side to side pivotal movement of the header relative to the adapter as well as vertical floating movement of the header. Thus the suspension arms 33 and 34 include springs which have a spring force which can be adjusted to vary the lifting force applied to the header from the adapter. Or the suspension can use a float cylinder system which the lift force is controlled and is variable to change the ground force.

The control system includes the control unit 300 which is responsive to input from a number of sensing systems which monitor certain operations of the header.

Thus the sensing systems include a first sensing system 50 which provides sensors 501 and 502 mounted on supports 503 at the end plates of the header and projecting forwardly from the transverse line of the cutter bar for monitoring the crop in front of the header as the crop approaches the cutter bar. The sensors 501, 502 can comprise devices such as a camera or lidar for generating a stream of images of the incoming crop. Or the sensors can comprise an imaging system and an ultrasonic height sensor 505 which detects the top of the incoming crop. The sensors for height and image can be located at the same positions on the header or at different positions for the best detection of the incoming crop. In a further alternative the height sensors can be provided as contact sensors 504 for physically engaging the heads of the crop.

The sensing system includes a second sensing system 60 which monitors the flow of material on the header. This includes a plurality of sensors 601 arranged in a row above and behind the cutter bar at a suitable fixed location on the header frame or on a support member attached to the header frame. The sensors provide a line of sight on to the heard immediately behind the cutter bar so as to monitor crop moving rearwardly over the cutter bar on to the drapers. Each sensor 601 comprises a camera which generates a series of sequential images of one portion of the header so that in combination the whole cutter bar is monitored with a series of sequential images forwarded to the control unit 300. These images are compared to generate a rate of flow of the crop material moving over the cutter bar so that any changes in crop flow rate can be detected by the control unit 300.

The second sensing system 60 further comprises a further array of cameras 603, 604 and 605 mounted on a support 602 attached to the frame. The cameras 603 and 604 are located over the drapers 24 and 25 respectively so as to monitor the crop material thereon. The camera 605 is located over the draper 26 feeding rearwardly into the feeder house of the combine. Again these cameras generate a series of images which are compared to detect a rate of flow of the crop to material.

The sensing system includes a third sensing system 70 which monitors the condition of the crop on the field downstream of the cutting system. This includes a row of sensors or cameras 701 carried on a suitable mounting such as a fixed portion of the frame behind the header. These cameras have a field of view of the ground behind the cutter bar and in advance of the ground wheels of the combine so as to monitor the effectiveness of the cutting. The sensors can be cameras or can include ultrasonic height sensors.

The sensing system includes a fourth sensing system 80 which monitors the any wrapping of crop around the reel. This includes at least one sensor 801 mounted at a fixed position relative to the reel at one end of the reel which generates a laser beam along the reel at one angular position around the reel so that the reel rotates past the beam. The beam is located at a position so that it detects the presence of crop material which occludes the beam. The monitoring system can distinguish the presence of material which fully wraps from crop material which merely carries back over the reel temporarily by analyzing amount of time which the beam is occluded. Thus the system can detect when crop material extends at least partly around the reel and remains in place for more than one rotation of the reel.

The control system 300 further includes outputs 90. These include a display 901 to the operator in the cab or at a remote location. These further include a outputs 902, 903, 904 to the control system 40 of the combine to provide outputs 401, 402 and 403 for controlling ground speed, header height and reel location.

The sensor system 50 is arranged to provide data concerning the presence of downed crop lying at or parallel to the ground. This information can be generated by image analysis looking for crop stem angles as detected by cameras 501, 502. Other detections methods can also be used including head sensors and by the ground sensors since head sensors can detect the location of the top of the crop at a position significantly lower than the expected crop heads. This indicates in front of the header the presence of downed crop. Ground sensors can also detect downed crop since they can detect reflections from a height significantly higher than the ground at the cutter bar passes over downed crop. This information can be used in the algorithm of the processor to provide to the operator or to the combine system information which instructs the combine harvester to urgently lower the cutter bar to the ground to pick up the downed crop. In addition an instruction can be provided to the combine either directly to the combine control systems or to the operator to lower the reel so that the reel bats our position immediately adjacent the cutter bar the lift the downed crop over the cutter bar. The controller can also use the height of reel in dependence on the output from the system defining the height of the crop canopy so as to best position the reel relative to the cutter bar to provide the best cutting action.

The control unit also receives a speed signal which allows the control of the height of the cutter bar to be managed at a required rate of change dependent upon the forward speed of the vehicle.

In accordance with one improvement the arrangement described above provides a system for autonomously detecting one or more conditions of operation of the header to generate an output signal responsive thereto and providing in response to the signal a control output to the machine.

The control output can provide simply a display 901 to the operator warning of the detected condition. However the system more preferably provides the control outputs 902, 903 and 904 which provides an operation to one or more controlled components of the header and particularly the ground speed, header height and reel location.

The system 60 can be used to detect differential rates of flow of crop on the header at different locations so that a detection is made when the rate changes at one location differently from at another location. This can be indicative of a problem in the system rather than merely a temporary reduction in total crop flow. As set forth above the system can detect any disruption in the crop flow of the header immediately behind the cutter bar which would be indicative of a local problem on the cutter bar as indicated by a halt in crop flow at one location. Again a comparison between the different zones of the cutter bar can also provide an indication of additional problems and distinguish from anomalies not related to cutting problems such as bare patches on the field. The monitoring can use time as a factor to distinguish from temporary anomalies and blockages or breakages requiring specific action.

As set forth above, the system 60 can also provide information on the rate of crop flow on the conveyors 24, 25 and also the rate of crop flow on the conveyor 26 at the intake to the harvesting machine. The system can use a comparison of rates between the different locations to indicate problems of failures in the conveying system. Also the rate of flow at the intake into the feeder house is particularly indicative of a problem in that a slowing of the rate of flow indicates bunching of the crop which is generally caused by overfeeding into the feeder house which can lead to lumpy feed into the combine or more importantly to a potential blockage.

Behind the cutter bar, the condition detected by the system 70 is the presence of a crop streak of uncut or poorly cut crop behind the cutter bar or a band of disturbed soil behind the cutter bar.

As set forth above the detection is primarily carried out by analysis of a series of sequential images to determine changes in the images. These can be used to detect changes in rate or changes in the location and condition of the crop such as the height or angle. The images can be obtained by different imaging systems including a Camera, radar or lidar. The sensors can also include an ultrasonic height sensor.

The output to the combine harvester can include the following:

-a- the control output to the machine causes a reduction in ground speed.

-b- a halt in ground speed and raising of the cutter bar to clear a cutter bar blockage of soil and/or crop material.

-c- movement of the reel to change reel height.

-d- movement of the reel forwardly or rearwardly.

-e- changes in the reel finger angle.

-f- adjustment of the reel support arms 181, 182 and 183 and 184 independently to accommodate down sections of crop differentially across a wide header.

-g- to halt the drive system to the side drapers 24 and 25 in the event of detection of or prediction of a blockage at the feed system.

-h- to halt the side drapers 24 and 25 in the event of detection of or prediction of a blockage at the feed system.

-j- to provide a delay in restarting the side drapers after the blockage is removed and the operation of the system restarts. That is, upon detection of the restarting of the stalled feed member, the drive to the side drapers is held stationary for a period of time to allow the amount of crop in the feed system to pass into the combine separation before more material is fed from the side drapers.

-k- in the event a blockage is predicted rather than actually detected, the speed of operation of the side drapers and be slowed, optionally with slowing of the forward speed of the machine to give opportunity to the system to clear the potential blockage rather than allow it to occur.

The lodgment of the crop is detected by a combination of an analysis of the difference of the stem angles from vertical and a detection of a top of the crop in advance of the cutter bar and the output signal is dependent on categorizing the degree of lodgment. This can be best controlled by generating an output signal dependent on different values from a look-up table.

The invention claimed is:

1. A crop harvesting apparatus comprising:
    a harvesting vehicle mounted on ground wheels for movement across ground carrying a standing crop for harvesting;
    a header having a cutter bar for cutting standing crop and a crop transport device for transporting the standing crop inwardly from ends of the header to a collection location of the harvesting vehicle and a reel mounted above the cutter bar for rotation about an axis parallel to the cutter bar to sweep the crop over the cutter bar to the transport device;
    a mounting assembly for carrying the header on the harvesting vehicle;
    a detector for detecting reel wrapping where crop material extends at least partly around the reel and remains in place for more than one rotation of the reel and for generating a signal in response thereto, wherein the detector generates a laser beam on the reel and detects reel wrapping by detecting material occluding the laser beam;
    and a control system arranged to generate an output signal responsive thereto and providing in response to the signal a control output to the machine.

2. The apparatus according to claim 1 wherein the vehicle comprises a swather tractor.

3. The apparatus according to claim 1 wherein the condition autonomously detected is any disruption in the crop flow of the header behind the cutter bar.

4. The apparatus according to claim 1 wherein the detection includes a lookup table of conditions.

5. The apparatus according to claim 1 wherein the control output to the machine causes movement of the reel forwardly or rearwardly.

6. The apparatus according to claim 1 wherein the control output to the machine causes changes in a reel finger angle.

7. The apparatus according to claim 1 wherein the control output comprises a display to the operator warning of the detected condition.

8. The apparatus according to claim 1 wherein the control output provides an operation to halt forward movement of the machine.

* * * * *